3,529,057
PURIFIED PERIODIC ACID-OXIDIZED MUCOPEPTIDE OF MYCOBACTERIA CELL WALLS CONSTITUTING A VACCINE ENHANCING NON-SPECIFIC HOST RESISTANCE AGAINST PATHOGENIC BACTERIAL INFECTIONS
Kanzi Tsuchiya, Takarazuka, and Akira Misaki, Nishinomiya, Japan, assignors to Takeda Chemical Industries, Ltd., Osaka, Japan
Continuation-in-part of application Ser. No. 479,518, Aug. 13, 1965. This application Aug. 20, 1968, Ser. No. 754,023
Claims priority, application Japan, Aug. 14, 1964, 39/46,863; Aug. 19, 1964, 39/47,443
Int. Cl. C12k 5/00
U.S. Cl. 424—92    5 Claims

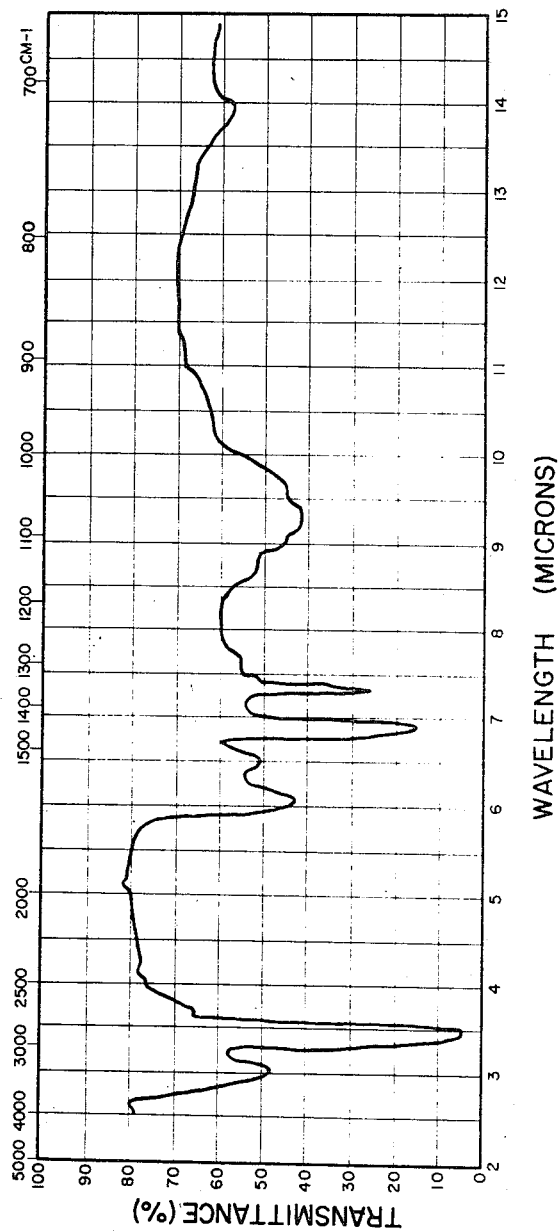

ABSTRACT OF THE DISCLOSURE

A purified non-specific vaccine for enhancing non-specific resistance of a host to virulant bacterial infections and process for producing it. A mucopeptide-containing component of cell walls of mycobacteria is oxidized with periodic acid or a water-soluble salt in an aqueous medium and the resulting component is hydrolyzed with an acid.

This application is a continuation-in-part of application Ser. No. 479,518, filed Aug. 13, 1965, now abandoned.

This invention relates to a novel and purified non-specific vaccine, which is highly effective in enhancing non-specific resistance of a host to virulent bacterial infections, and to a new method for preparing the purified non-specific vaccine from a vaccine-containing starting material which is the mucopeptide-containing component of cell walls of microorganisms of the genus Mycobacterium.

Hitherto known materials which are effective in enhancing non-specific resistance to a host comprise, for example, certain kinds of intact bacteria and their toxins. But the hitherto known materials are accompanied by such harmful actions as virulence or pyrogenity, as to exclude them from practical use. While it has been recognized that injection of a component of mycobacterial cells can also enhance non-specific resistance of a host to pathogenic bacterial infections, difficulties are encountered in their clinical use since they are bound up with side effects such as fever or immediate hypersensitivity and tuberculin reaction.

We have now found that a mucopeptide-containing component of cell walls of mycobacterial cells can be lessened in its side effects such as immediate hypersensitivity or tuberculin reaction without losing its non-specific resistance, by the process which involves oxidation of the mucopeptide-containing component of cell walls of the mycobacteria with periodic acid, followed by mild hydrolysis of the oxidized material such as, if desired, a further treatment of the hydrolyzate with protease.

The first object of this invention is to provide a purified non-specific vaccine which is highly effective in enhancing non-specific resistance of a host against various infections with pathogenic bacteria without undesirable side effects such as tuberculin reaction and immediate hypersensitivity.

Another object of this invention is to provide an improved process for preparing non-specific vaccine from the mucopeptide-containing component of cell walls of mycobacteria which comprises oxidizing the mucopeptide-containing component of cell walls of mycobacteria with periodic acid or its water soluble salts in an aqueous medium at a temperature not higher than 30° C., and hydrolyzing the resultant component with an acid at a temperature not higher than 50° C.

Mycobacteria employed in this invention may, for example, be as follows:

Mycobacterium tuberculosis $H_{37}Rv$
Mycobacterium tuberculosis $H_2$
Mycobacterium bovis Rabenel
Mycobacterium bovis No. 10
Mycobacterium bovis BCG
Mycobacterium avium Flamingo
Mycobacterium avium Kirchberg
Mycobacterium smegmatis
Mycobacterium phlei
Mycobacterium ranae
Mycobacterium butyricum
Mycobacterium sp. 607

The vaccine-containing starting material which is the mucopeptide-containing component of cell walls of mycobacteria, can be prepared by collecting mucopeptide fraction by means which are per se conventional and which may be physical means or chemical means.

PHYSICAL MEANS

Cells of mycobacteria are ruptured by means of a cell-homogenizer, ball mill or mortar in combination with glass beads, glass powder or sand. The ruptured cells are centrifuged in about 0.1 mole phosphate buffer solution of pH about 6 to 7 under a gravitational force at about 4,500 to about 10,000 times gravity to give a clear supernatant and sediments are collected and centrifuged in 5 percent aqueous sodium chloride solution under a gravitational force at about 9,000 to about 11,000 times gravity to give a clear supernatant and sediments. As the sediments contain such undesirable materials as waxes, lipids, proteins, nucleic acids, polysaccharides or glycogen-like substances, it is preferable to remove the undesirable materials from the sediments by the following means.

Thus, the undesirable proteins can be digested with a protease such as trypsin, a protease produced by Streptomyces griseus ("Pronase," sold by California Corporation for Biochemical Research, U.S.A.), etc. For removal of the undesirable proteins, the use of Pronase is superior to that of trypsin.

The undesirable nucleic acids can be digested with an enzyme capable of hydrolyzing the nucleic acids, but even without the practice of this procedure, the vaccine-containing component will be found to contain substantially no undesirable nucleic acids.

It is preferable to remove the undesirable waxes and lipids as completely as possible from the mucopeptide-containing component. For the removal of the undesirable waxes and lipids, it is possible to extract these with alcohol, ether, acetone, chloroform, or a mixture thereof, or with an organic solvent containing a small amount of acid which is particularly effective to remove firmly bound lipids. The procedure for removal of the undesirable waxes and lipids may be employed at any stage and may be applied to, for example, the cells which are not ruptured, or the sediments obtained by the foregoing centrifugation under a gravitational force at about 4,500 to about 10,000 times gravity, or the hydrolyzate obtained in the method of this invention.

CHEMICAL MEANS

The cells of mycobacteria are extracted with a solvent capable of extracting the undesired lipids such as acetone, ether, etc., and are then shaken in about 80 to 90 percent aqueous phenol solution at a temperature of about 60 to 80° C. for about 30 minutes to about an hour. The resulting sediments are repeatedly subjected to the above said procedure, if necessary. The sediments thus obtained are suspended in twice their volume of formamide and the suspension is allowed to stand at a temperature of about 80 to 150° C. for about 30 minutes to an hour. If necessary, the resulting sediments thus obtained may again be subjected to the above said treatment with formamide. The sediments thus obtained are washed in turn with water, ethanol and ether to give the mucopeptide-containing component as white powder.

In the method of this invention, the mucopeptide-containing component thus obtained is oxidized with periodic acid or a water soluble salt thereof in an aqueous medium at a temperature not higher than 30° C. and then the resultant component is hydrolyzed with an acid at a temperature not higher than 50° C.

Suitable water-soluble salts of periodic acid comprise, for example, sodium periodate, potassium periodate, sodium metaperiodate and potassium metaperiodate.

The oxidation of the mucopeptide-containing component with periodic acid or a water-soluble salt thereof should be carried out at a temperature not higher than 30° C., preferably at about 0 to 20° C. A reaction temperature for the oxidation higher than 30° C. gives undesirable effects upon the purified vaccine of this invention. The acid hydrolysis should be carried out at a temperature not higher than 50° C. and preferably proceeds in the acid concentration of about 0.05 to about 0.2 normal. A temperature higher than 50° C. for the hydrolysis gives undesirable effects upon the purified vaccine of this invention. The acid used for the hydrolysis may, for example, be an inorganic acid such as sulfuric acid, hydrochloric acid, or an organic acid such as acetic acid, etc. We have also found that reduction of the resultant component obtained in the oxidation of the method of this invention with sodium borohydride makes the hydrolysis of the following step easy. The reduction is generally carried out at a slightly alkaline to neutral pH.

The purified vaccine thus obtained has the following properties:

Solubility: It is not soluble in water or common organic solvents.
Analysis:
  Total amino acids measured by colorimetry at a wave length of 605 millimicrons are 77 percent by weight, as glutamic acid.
  Total amino sugars in terms of glucosamine measured by a method described in Biochemical Journal, vol. 61, page 586 (1955) are about 14 to about 15 percent by weight.
  Neutral sugar constituents measured by a method described in Analytical Chemistry, vol. 28, page 350 (1956) are about 2 to about 3 percent by weight.
  Relative molar ratio of the main constituents measured by a method described in Biochemical Journal, vol. 72, pages 647–654 (1959) is approximately as follows:

Glutamic acid _____ 2
    Alanine _____ 3
    Diaminopimelic acid _____ 1–1.5
    Glucosamine _____ 1
    Muramic acid _____ 1

Only traces of minor amino acids were detected.
It is digestable by lysozyme.
  Its infrared absorption spectrum measured in Nujol is shown on FIG. 1, and the significant absorption bands in microns are as follows:
    3.06
    6.05
    6.52
    8.25 (shoulder)
    9.12 (shoulder)
    9.35
    9.65 (shoulder)

The purified vaccine of this invention has the advantage that it does not give hypersensitive effect to a host. For example, when the purified vaccine suspended in mineral oil is injected to guinea pigs of body weight of about 300 to 400 grams and on the other hand killed *Mycobacterium bovis* BCG suspended in mineral oil is injected to another group of guinea pigs of the same body weight, and in 8 weeks after the injections 0.1 milliliter of tuberculin solution diluted to 1,000 times by volume of its original amount is injected intradermally to each group, the group injected with the killed Mycobacterium BCG exhibits strongly positive tuberculin reaction, but the group injected with the purified vaccine shows no such positive reaction.

When the purified vaccine of this invention is administered to a host in a form of suspension in water or mineral oil, it shows an effect of enhancing remarkably the resistance of the host against various infections with Gram-positive and Gram-negative bacteria even at a small dose of 0.1 milligram per kilogram of body weight of the host. The purified vaccine has also such advantage over the vaccine-containing component of the starting material of this invention that it is more easily absorbed in living bodies and shows little of side effects such as immediate hypersensitivity, tuberculin reaction, etc. The purified vaccine can be administered at a dose, for example, of 2 to 10 milligrams per kilogram of body weight in a form of suspension in water, or of not higher than about 0.05 to about 1 milligram per kilogram of body weight in mineral oil.

The purified vaccine according to the present invention exerts a protective activity against various bacterial infections, Gram-positive as well as Gram-negative. Thus, mice pretreated 3 days before infection with intraperitoneal injection of the purified vaccine at a dose of 0.1 gram in 1 milliliter of mineral oil (e.g. Brakeol, a product of Pennsylvania Oil Co. Ltd.) are protected for prolonged periods of time against infection by, for example, *Staphylococcus aureus*, *Streptomyces pyogenes*, *Listeria monocytogenes*, *C. kutscheri*, *Klebsiella pneumoniae*, *Pseudomonas aeruginosa*, *Escherichia coli*, and *Proteus vulgaris*.

The following examples set forth presently preferred illustrative but non-limitative embodiments of the invention. In the following examples, percent is based on weight basis unless otherwise noted.

Example 1

Ten liters of culture, obtained by incubating *Mycobacterium bovis*, Bergy et al. (BCG strain) (ATCC No. 19015) in a Sauton medium at 37° C. for 4 weeks, are filtered to give the cells. The cells are soaked in ethanol for 3 days, and washed at 55° C. three times with 800 milliliters each of acetone and one time with 800 milliliters of ether, followed by addition of 0.1 mole of phosphate buffer solution (pH 7.0) and 200 grams of glass powder, and the mixture is subjected to a crusher for 5 hours, followed by the addition of 1 liter of water. The obtained mixture containing crushed cells is centrifuged at 350 times gravity for 20 minutes. The supernatant is again centrifuged 4500 times gravity for 50 minutes. The sediments are collected and suspended in 5 percent aqueous sodium chloride solution and the suspension is centrifuged at 10,000 times gravity. The sediments are collected, and again subjected to centrifugation at 10,000 times gravity by the use of 5 percent aqueous sodium chloride solution. The obtained sediments are washed with water and lyophilized to give 7.5 grams of powder.

Five grams of the powder are suspended in a mixture of ethanol, ether and chloroform (1:1:1 by volume) and this suspension is shaken at room temperature (about 20° to about 30° C.) for ten days to remove impurities such as lipids, waxes, etc. The powder thus treated with the mixed solvent is suspended in 200 milliliters of 0.1 mole phosphate buffer solution (pH 7.2). Ten milligrams of crystalline trypsin are added to the suspension. The suspension is incubated at 37° C. for 24 hours and then centrifuged to collect sediments. To the sediments are added 50 milliliters of 0.5 normal aqueous sodium hydroxide solution and this mixture is allowed to stand at room temperature for an hour. Then the mixture is centrifuged to collect sediments. The sediments are washed with 0.1 normal acetic acid solution and with distilled water, and dialyzed to distilled water free from pyrogen. The dialyzate is lyophilized to give 2 grams of crude vaccine.

The crude vaccine has the following properties:

Solubility: Not soluble in water or common organic solvents.
Analysis:
  N: 3.7 percent
  F: 0.0 percent (i.e. nucleic acids-free)
  Bound lipids: 31 percent
  Neutral sugar constituents measured by a method described in Analytical Chemistry, vol. 28, page 350 (1956) are 31 percent, as glucose.
  Relative molar ratio of D-glucose and D-arabinose measured by a method described in Analytical Chemistry, vol. 28, page 350 (1956) is approximately 0.75, 1.00 and 2.12, respectively.
  Relative molar ratio of amino sugars and amino acids measured by a method described in Biochemical Journal, vol. 72, pages 647–654 (1959) is approximately as follows:

Glutamic acid _____ 1.00
    Alanine _____ 1.31
    Diaminopimelic acid _____ 0.72
    Glucosamine _____ 0.57
    Muramic acid _____ 0.52

Traces of other amino acids, such as aspartic acid, glycine, valine, arginine, leucine are also present. This crude vaccine is partially solubilized by lysozyme.

One gram of the crude vaccine obtained is suspended in 500 milliliters of 0.1 normal aqueous periodic acid solution. The suspension is allowed to stand at 5° C. for 2 weeks, and then the mixture is centrifuged to collect sediments. The sediments are emulsified in 200 milliliters of water. To this emulsion is added 0.1 gram of sodium borohydride and the mixture is allowed to stand at room temperature for 24 hours. To this mixture is added hydrochloric acid to make its concentration 0.1 normal, whereby the excess of the sodium borohydride is decomposed. Then the mixture is subjected to mild hydrolysis by allowing it to stand at room temperature for 24 hours. The reaction mixture is centrifuged to collect sediments. The sediments are washed and lyophilized to give 0.5 gram of purified vaccine.

The purified vaccine has the following properties:

Solubility: Not soluble in water or common organic solvents.
Analysis:
  Total amino acids measured by colorimetry at a wave length of 605 millimicrons with ninhydrin are 77.13 percent, as glutamic acid.
  The total amino sugar measured by a method described in Biochemical Journal, vol. 61, page 586 (1955) are 14.5 percent, as glucosamine.
  Neutral sugar constituents measured by a method described in Analytical Chemistry, vol. 28, page 350 (1956) are 2.3 percent.
  Relative molar ratio of main constituent measured by a method described in Biochemical Journal, vol. 72, pages 647–654 (1959) is approximately glutamic acid (1.00), alanine (1.31), diaminopimelic acid (0.64), glucosamine (0.54) and muramic acid (0.98).
  Only traces of minor amino acids were detected.
  The infrared spectrum of this vaccine measured in Nujol is as on FIG. 1.

Example 2

A purified vaccine which shows weaker tuberculin reaction than the purified vaccine obtained in Example 1 and has the same properties described in Example 1 for the crude vaccine obtained in Example 1 is obtained when, while otherwise proceeding as set forth in Example 1, the trypsin of Example 1 is replaced by 150 milligrams of Pronase (California Corporation for Biochemical Research, U.S.A.).

Example 3

Fifteen grams of cells of Mycobacterium bovis BCG (ATCC No. 19915) defatted with acetone are added to 200 milliliters of 88 percent aqueous phenol solution. The mixture is shaken at 60° C. for an hour and centrifuged to collect sediments. The sediments are washed with ethanol and with ether, followed by the addition of 200 milliliters of 70 percent aqueous phenol solution. The mixture is shaken at room temperature for 24 hours, and then centrifuged to collect sediments. The sediments are suspended in 100 milliliters of formamide. The suspension is shaken at 100 milliliters of formamide. The suspension is shaken at 120° C. for 30 minutes and cooled, then is centrifuged to collect sediments. The sediments are subjected two times to centrifugation by the use of formamide. The sediments thus obtained are washed several times with 50 percent aqueous ethanol containing 1 percent hydrochloric acid and with ethanol alternately, and dried under reduced pressure at room temperature to give 1 gram of crude vaccine. The crude vaccine thus obtained has the same properties as described in Example 1 for the crude vaccine obtained in Example 1.

One gram of the crude vaccine thus obtained is suspended in 500 milliliters of 0.1 normal aqueous sodium periodate solution. The suspension is allowed to stand at 5° C. for 2 weeks, and then the mixture is centrifuged to collect sediments. The sediments are emulsified in 200 milliliters of water. To this emulsion is added 0.1 gram of sodium borohydride and the mixture is allowed to stand at room temperature for 24 hours. To this mixture is added hydrochloric acid to make its concentration 0.1 normal, whereby the excess of the sodium borohydride is decomposed, and hydrolysis of the mixture is effected.

Then the mixture is centrifuged to collect sediments. The sediments are washed and lyophilized to give 0.5 gram of purified vaccine. The purified vaccine has the same properties as described in Example 1 of the purified vaccine obtained in Example 1.

Example 4

The cells of Mycobacterium sp. 607 (ATCC No. 19016) collected from two week culture in Sauton medium are sterilized by addition of 2 percent aqueous phenol solution and lyophilized. Seven hundred grams of the cells are ground with an equal volume of glass powder at 5° C. for 24 hours. After addition of 4 liters of water, the disrupted cells are centrifuged five times at 2,500 times gravity for 20 minutes to precipitate unbroken cells and glass powder. The supernatant liquid is then centrifuged at 10,000 times gravity for 40 minutes, after which the sediments are washed thoroughly with water and with 1 normal aqueous sodium chloride solution, then again with water. The material thus obtained is lyophilized to give 37.2 grams of crude vaccine, which has the same properties as described in Example 1 for the crude vaccine obtained in Example 1.

The crude vaccine is suspended in 1 liter of 0.05 mole aqueous sodium periodate solution and oxidized with stirring at 5° C. to cleave neutral polysaccharide. After 10 days when the reaction is completed, the insoluble residue is washed with water, then suspended in 500 milliliters of water. To the suspension is added dropwise 1 gram of sodium borohydride in 100 milliliters of water with stirring, and the mixture is left overnight at room temperature. The excess reagent is decomposed by addition of sulfuric acid to make its concentration 0.1 normal. After standing for 24 hours at room temperature, this reaction mixture is centrifuged to collect sediments. The sediments are washed with water and then lyophilized. This material is extracted with 1 liter of a mixture of chloroform-ethanol-ether (1:1:1) under reflux for 24 hours to remove lipids therefrom, and the residue is then suspended in 0.5 mole citrate-phosphate buffer (pH 7.0) and incubated with Pronase (340 milligrams) at 37° C. for 24 hours. After one more treatment with the enzyme, the insolubles are washed with the buffer and with water, and then lyophilized to give 10.5 grams of purified vaccine, which has the same properties as described in Example 1 for the purified vaccine obtained in Example 1 and shows weaker tuberculin reaction than the purified vaccine obtained in Example 1.

Example 5

The same purified vaccine as obtained in Example 1 is obtained when, while otherwise proceeding as set forth in Example 1, the periodic acid is replaced by sodium periodate.

Example 6

The same purified vaccine as obtained in Example 2 is given when, while otherwise proceeding as set forth in Example 2, the periodic acid is replaced by sodium periodate.

What is claimed is:

1. A purified vaccine with less immediate hypersensitivity and tuberculin reaction side effects, effective to enhance non-specific host resistance against pathogenic Gram-positive and Gram-negative bacterial infection, of mycobacterial cell origin which has the following properties:

Solubility: It is not soluble in water or common organic solvents.
Analysis:
   Total amino acids measured by colorimetry at a wave length of 605 millimicrons are 77 percent by weight, as glutamic acid.
   Total amino sugars in terms of glucosamine are about 14 to about 15 percent by weight.
   Neutral sugar constituents are about 2 to about 3 percent by weight.
   Relative molar ratio of main constituents is approximately as follows:

| | |
|---|---|
| Glutamic acid | 2 |
| Alanine | 3 |
| Diaminopimelic acid | 1–1.5 |
| Glucosamine | 1 |
| Muramic acid | 1 |

Only traces of minor amino acid are present.
It is digestable by lysozyme.
Its infrared absorption spectrum measured in Nujol is shown in FIG. 1 and the significant absorption bands in microns are as follows:
   3.06
   6.05
   6.52
   8.25 (shoulder)
   9.12 (shoulder)
   9.35
   9.65 (shoulder)

said purified vaccine being produced in a process which comprises first removing all undesirable waxes, lipids, proteins and nucleic acids, oxidizing the mucopeptide-containing component of cell walls of mycobacteria, ruptured by physical or chemical means, with a member selected from the group consisting of periodic acid and water soluble salts thereof in an aqueous medium at a temperature not higher than 30° C., and hydrolyzing the resultant component with an acid at a temperature not higher than 50° C.

2. An injectable pharmaceutical composition which consists essentially of the purified vaccine of claim 1 and mineral oil in the proportion of about 0.1 gram of vaccine per milliliter of oil.

3. In a process for preparing a vaccine with less immediate hypersensitivity and tuberculin reaction side effects, effective to enhance non-specific host resistance against pathogenic Gram-positive and Gram-negative bacterial infection, the improvement which comprises first removing all undesirable waxes, lipids, proteins and nucleic acids and then oxidizing the mucopeptide-containing component of said cell walls, ruptured by physical or chemical means, with a member selected from the group consisting of periodic acid and water soluble salts thereof in an aqueous medium at a temperature not higher than 30° C., and hydrolyzing the resultant component with an acid at a temperature not higher than 50° C.

4. In a process for preparing a vaccine with less immediate hypersensitivity and tuberculin reaction side effects, effective to enhance non-specific host resistance against pathogenic Gram-positive and Gram-negative bacterial infection, the improvement which comprises first removing all undesirable waxes, lipids, proteins and nucleic acids and then oxidizing the mucopeptide-containing component of said cell walls, ruptured by physical or chemical means, with a member selected from the group consisting of periodic acid and water-soluble salts thereof in an aqueous medium at a temperature not higher than 30° C., reducing the resultant component with sodium borohydride at a temperature not higher than 50° C., and hydrolyzing the resultant component with an acid at a temperature not higher than 50° C.

5. In a process for preparing a vaccine with less immediate hypersensitivity and tuberculin reaction side effects, effective to enhance non-specific host resistance against pathogenic Gram-positive and Gram-negative bacterial infection, the improvement which comprises first removing all undesirable waxes, lipids, proteins and nucleic acids and then oxidizing the mucopeptide-containing component of said cell walls, ruptured by physical or chemical means, with a member selected from the group consisting of periodic acid and water-soluble salts thereof in an aqueous medium at a temperature not higher than 30° C., reducing the resultant component with sodium borohydride at a temperature not higher than 50° C., hydrolyzing the resultant component with an acid at a temperature not higher than 50° C., and then treating the hydrolyzate with protease.

References Cited

Chem. Abstracts 41: 4540e (1947).
Chem. Abstracts 49:5585f (1955).
Chem. Abstracts 50:3550d (1956).
Chem. Abstracts 50:7227e (1956).

SHEP K. ROSE, Primary Examiner